United States Patent
Bumb et al.

(10) Patent No.: US 12,134,067 B2
(45) Date of Patent: Nov. 5, 2024

(54) METHOD AND A SYSTEM FOR THE REMOVAL OF CARBON DIOXIDE FROM SOLVENTS

(71) Applicant: CARBON CLEAN SOLUTIONS LIMITED, Reading (GB)

(72) Inventors: Prateek Bumb, London (GB); James Jonathan Hall, London (GB); Gopi Neeliesetty, Bangalore (IN)

(73) Assignee: CARBON CLEAN SOLUTIONS LIMITED, Reading (GB)

(*) Notice: Subject to any disclaimer, the term of this patent is extended or adjusted under 35 U.S.C. 154(b) by 624 days.

(21) Appl. No.: 17/255,751

(22) PCT Filed: Jun. 24, 2019

(86) PCT No.: PCT/GB2019/051773
§ 371 (c)(1),
(2) Date: Dec. 23, 2020

(87) PCT Pub. No.: WO2020/008169
PCT Pub. Date: Jan. 9, 2020

(65) Prior Publication Data
US 2021/0138391 A1    May 13, 2021

(30) Foreign Application Priority Data
Jul. 2, 2018   (IN) .............................. 201811024582

(51) Int. Cl.
*B01D 47/00*    (2006.01)
*B01D 53/14*    (2006.01)
(Continued)

(52) U.S. Cl.
CPC ..... *B01D 53/1425* (2013.01); *B01D 53/1475* (2013.01); *B01D 53/1493* (2013.01);
(Continued)

(58) Field of Classification Search
CPC ............ B01D 53/1425; B01D 53/1475; B01D 53/1493; B01D 53/62; B01D 53/78;
(Continued)

(56) References Cited

U.S. PATENT DOCUMENTS 5,766,548 A    6/1998  Soria
6,500,397 B1   12/2002 Yoshida et al.
(Continued)

FOREIGN PATENT DOCUMENTS

CN    1110624 A     10/1995
CN    102652033 A   8/2012
(Continued)

OTHER PUBLICATIONS

Bougie, Francis, et al., Analysis of the regeneration of monoethanolamine aqueous solutions by microwave irradiation, Energy Procedia, Elsevier, NL, vol. 142, Jan. 31, 2018, pp. 3661-3666.
(Continued)

*Primary Examiner* — Long T Tran
*Assistant Examiner* — James J Kim
(74) *Attorney, Agent, or Firm* — Bryan D. Zerhusen; Nicholas R. Herrel; CANTOR COLBURN LLP (57) ABSTRACT

A method and a system for the removal of carbon dioxide from solvents.

22 Claims, 4 Drawing Sheets

(51) Int. Cl.
*B01D 53/62* (2006.01)
*B01D 53/78* (2006.01)

(52) U.S. Cl.
CPC ............. *B01D 53/62* (2013.01); *B01D 53/78* (2013.01); *B01D 2252/20415* (2013.01); *B01D 2252/20431* (2013.01); *B01D 2252/20447* (2013.01); *B01D 2252/20484* (2013.01); *B01D 2252/20489* (2013.01); *B01D 2252/504* (2013.01); *B01D 2252/60* (2013.01); *B01D 2257/504* (2013.01); *B01D 2258/0283* (2013.01); *B01D 2259/806* (2013.01)

(58) Field of Classification Search
CPC ........... B01D 2252/20415; B01D 2252/20431; B01D 2252/20447; B01D 2252/20484; B01D 2252/20489; B01D 2252/504; B01D 2252/60; B01D 2257/504; B01D 2258/0283; B01D 2259/806; Y02C 20/40; C10L 2290/12; C01B 32/50
USPC .......................................................... 96/242
See application file for complete search history.

(56) References Cited

U.S. PATENT DOCUMENTS

| | | |
|---|---|---|
| 9,908,085 B2 | 3/2018 | Parisi |
| 2007/0148068 A1 | 6/2007 | Burgers et al. |
| 2007/0148069 A1 | 6/2007 | Chakravarti et al. |
| 2008/0156190 A1 | 7/2008 | Lutz et al. |
| 2009/0199713 A1 | 8/2009 | Asprion et al. |
| 2011/0303088 A1 | 12/2011 | Dutra E Mello et al. |
| 2012/0285319 A1 | 11/2012 | Omole et al. |
| 2013/0319235 A1 | 12/2013 | Wolf et al. |
| 2014/0178278 A1 | 6/2014 | Siskin et al. |
| 2015/0083576 A1 | 3/2015 | Aboudheir et al. |
| 2015/0139879 A1 | 5/2015 | Giroudiere et al. |
| 2016/0193563 A1 | 7/2016 | Bumb |
| 2017/0157554 A1 | 6/2017 | Yu et al. |
| 2017/0173517 A1 | 6/2017 | Wong et al. |
| 2017/0274317 A1 | 9/2017 | Bumb |
| 2018/0001255 A1 | 1/2018 | Bumb et al. |
| 2018/0236437 A1 | 8/2018 | Tan et al. |
| 2018/0280871 A1 | 10/2018 | Verma et al. |
| 2018/0361312 A1 | 12/2018 | Dutra E Mello et al. |

FOREIGN PATENT DOCUMENTS

| | | |
|---|---|---|
| CN | 103153433 A | 6/2013 |
| CN | 104411806 A | 3/2015 |
| CN | 105307752 A | 2/2016 |
| CN | 107106967 A | 8/2017 |
| EP | 0558019 A2 | 9/1993 |
| GB | 2541399 A | 2/2017 |
| JP | 1986278336 A | 12/1986 |
| JP | 05301024 A | 11/1993 |
| JP | 08257355 A | 10/1996 |
| JP | 2009521313 A | 6/2009 |
| JP | 2014113544 A | 6/2014 |
| JP | 2016129877 A | 7/2016 |
| JP | 2017533090 A | 11/2017 |
| TW | 1619540 B | 4/2018 |
| WO | WO2012107429 A1 | 8/2012 |
| WO | 2014099241 A2 | 6/2014 |
| WO | WO 2014/118633 A2 | 8/2014 |
| WO | 2016027164 A1 | 2/2016 |
| WO | 2016057499 A1 | 4/2016 |
| WO | WO2016154753 A1 | 10/2016 |

OTHER PUBLICATIONS

International Search Report and Written Opinion for International Patent Application Serial No. PCT/GB2019/051773, mailed on Sep. 6, 2019.

Mcgurk, Stephen, J., et al., Microwave swing regeneration of aqueous monoethanolamine for post-combustion C02 capture, Applied Energy, Elsevier Science Publishers, GB, vol. 192, Feb. 14, 2017, pp. 126-133.

Samanta, Arunkumar, et al., Absorption of carbon dioxide into queous solutions of piperazine activated 2-amino-2-methyl-l-propanol, Chemical Engineering Science 64 (2009) 1185-1194.

Li et al. (2013, Characterization of piperazine/2-aminomethylpropanol for carbon dioxide capture. Energy Procedia, 37, 340-352) (Year: 2013).

METHOD AND A SYSTEM FOR THE REMOVAL OF CARBON DIOXIDE FROM SOLVENTS

CROSS-REFERENCE TO RELATED APPLICATIONS

This application is a National Stage of PCT/GB2019/051773, filed 24 Jun. 2019, titled A METHOD AND A SYSTEM FOR THE REMOVAL OF CARBON DIOXIDE FROM SOLVENTS, published as International Patent Application Publication No. WO 2020/008169, which claims the benefit and priority to Indian Patent Application No. 201811024582, filed 2 Jul. 2018, each of which is incorporated herein by reference in their entirety for all purposes.

DESCRIPTION OF INVENTION

The present invention relates to a method for the removal of carbon dioxide ($CO_2$) from solvents. The present invention also relates to a system for the removal of carbon dioxide ($CO_2$) from solvents. In particular, the present invention relates to a method, and a system, for the removal of carbon dioxide ($CO_2$) from $CO_2$ rich solvents.

BACKGROUND

Flue gases from power plants and other industrial activities include pollutants, for example greenhouse gases. One such greenhouse gas is $CO_2$ which contributes to the greenhouse effect.

US 2017/0274317 A1 describes carbon capture solvents and methods for using such solvents. Flue gases, or other $CO_2$ rich gaseous streams, containing $CO_2$ are contacted with a solvent for recovery of $CO_2$. By way of this contact, the relatively $CO_2$ lean solvent becomes relatively $CO_2$ rich and the flue gas is depleted of $CO_2$. The flue gas depleted of $CO_2$ can then be further stripped of other pollutants and/or released to atmosphere.

In carrying out the carbon capture process described in US 2017/0274317 A1, the $CO_2$ rich solvent needs to be regenerated so that it can be used to remove $CO_2$ from flue gases in a continuous process. The carbon capture ($CO_2$ capture) processes of the present invention are directed to $CO_2$ capture from/sequestration from flue gases, e.g. emissions from industrial plants that burn solid fuel such as coal-fired power plants. The carbon capture ($CO_2$ capture) processes of the present invention are also applicable to $CO_2$ capture from gas and oil fired boilers, combined cycle power plants, coal gasification, hydrogen plants and biogas plants.

Figure 1:
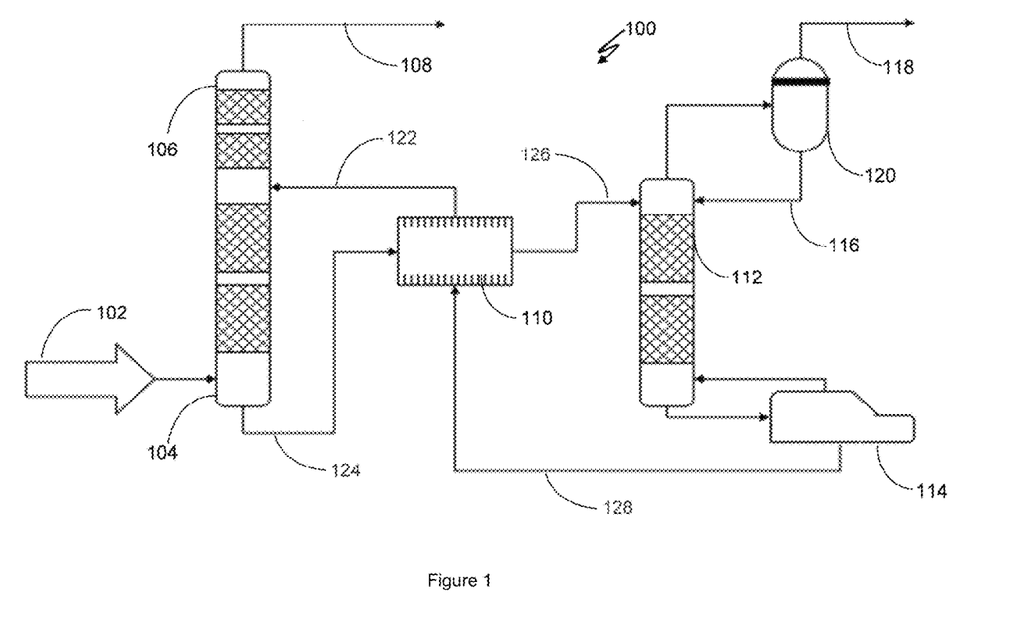
FIG. 1 shows schematically a prior art system that is used to capture $CO_2$ from flue gases. Amongst other components, the absorber, solvent heat exchanger and stripper are shown.

FIG. 1 illustrates a block diagram 100 of a conventional method for capturing $CO_2$ from flue gases. $CO_2$ is separated from a mixture of gases, using a solvent (initially a $CO_2$ lean solvent) which selectively reacts with the $CO_2$ (to form a $CO_2$ rich solvent). After the $CO_2$ has reacted with the solvent ($CO_2$ lean solvent), the solvent ($CO_2$ rich solvent) can be regenerated (to $CO_2$ lean solvent) using heat to release the $CO_2$ and regenerate the solvent for further $CO_2$ processing.

A flue gas 102 containing $CO_2$ is contacted with a liquid solvent 122 ($CO_2$ lean solvent) in a static packed column 104. The liquid solvent 122 ($CO_2$ lean solvent) is cascaded over the top of the static packed column 104 and falls under gravity to a bottom where it is collected in a sump.

A second static packed column 106, having structured packing, comprises of wash stages that remove traces of the solvent and volatile chemicals. A gaseous mixture depleted of $CO_2$ (i.e. the flue gas depleted of $CO_2$) passes through the wash stages to remove traces of the solvent and any volatile chemicals formed through degradation reactions of the solvent components. All of the wash stages occur in similar static structured packing and use water or acid for washing.

The flue gas 108 depleted of $CO_2$ is released from the top of the static packed column 104.

To remove the $CO_2$ from the solvent, the solvent 126 ($CO_2$ rich solvent) is fed into a top section of a stripper column 112 and allowed to fall under gravity over a packing material to the bottom of the stripper column 112. Inside the stripper column, the solvent 126 is heated. Upon heating, the reaction between the components of the solvent and $CO_2$ reverses, releasing $CO_2$ gas and forming a $CO_2$ depleted solvent.

At the bottom of the stripper column, the $CO_2$ depleted solvent ($CO_2$ lean solvent) is drawn into a reboiler 114. Inside the reboiler 114, the solvent is heated to a temperature high enough so that the water component of the solvent gets vaporized to steam. The reboiler 114 typically operates at a temperature of from 110 to 120° C.

The steam is transferred to the stripper column 112, where the steam heats the solvent. Upon heating, the reaction between the components of the solvent and $CO_2$ reverses, releasing $CO_2$ gas and forming a $CO_2$ depleted solvent ($CO_2$ lean solvent). The steam and the $CO_2$ rise to a top of the stripper column 112 where a condenser cools the steam. This condenses the steam into water 116. The condensed water 116 is returned to the top of the stripper column via a reflux drum 120 to remake the formulation of the original solvent.

The gaseous $CO_2$ 118 is used for downstream methods.

The solvent at the bottom of the stripper is recycled to an absorber as a lean solvent 128 via the heat exchanger 110, ready to repeat the absorption process again.

McGurk et al., "Microwave swing regeneration of aqueous monoethanolamine for post-combustion $CO_2$ capture", Applied Energy (2017), 192, disclosed that microwaves can regenerate spent aqueous monoethanolamine solutions.

There is a need for a more efficient method of regenerating a solvent after the solvent has become a $CO_2$ rich solvent in system 100. In particular, there is a need for a more efficient way of forming $CO_2$ lean solvent from $CO_2$ rich solvent. A preferred method would reduce the temperature required to remove $CO_2$ from the solvent. The reboiler 114, in the example above, typically operates at a temperature of from 110 to 120° C. Such a high temperature causes solvent degradation as well as increasing the cost of the method.

The present invention provides a method, and a system, of removing $CO_2$ from a solvent (e.g. a method of forming $CO_2$ lean solvent from $CO_2$ rich solvent).

According to a first aspect of the present invention, there is provided a method for regenerating a carbon dioxide ($CO_2$) lean solvent from a carbon dioxide ($CO_2$) rich solvent, the method comprising:

providing a carbon dioxide ($CO_2$) rich solvent; and, applying microwaves to the carbon dioxide ($CO_2$) rich solvent to form a carbon dioxide ($CO_2$) lean solvent.

Preferably, wherein the carbon dioxide ($CO_2$) rich solvent is an intensified solvent.

Further preferably, wherein the intensified solvent is:

a solvent that can achieve a high $CO_2$ loading (optionally ≥3.0 mol/L) and forms a greater proportion of bicarbonate salts than carbamate salts; and/or, a solvent that can achieve a high $CO_2$ loading due to a high concentration of active $CO_2$ absorbing components.

Advantageously, wherein:
the intensified solvent is any solvent disclosed in US2017/0274317/A1; and/or,
the intensified solvent comprises:
  a tertiary amine (for example, N-methyl-diethanolamine and/or 2-(diethylamino)ethanol), and/or,
  a sterically hindered amine (for example, 2-amino-2-ethyl-1,3-propanediol, 2-amino-2-hydroxymethyl-1,3-propanediol and/or 2-amino-2-methyl-1-propanol), and/or,
  a polyamine (for example, 2-piperazine-1-ethylamine and/or 1-(2-hydroxyethyl)piperazine), and/or,
  a carbonate buffer (for example, potassium carbonate), and/or,
  water (for example, deionised water).

Preferably, wherein the intensified solvent is a solvent comprising: an alkanolamine, a reactive amine and a carbonate buffer.

Further preferably, wherein the intensified solvent is CDRMax, as sold by Carbon Clean Solutions Limited.

Advantageously, wherein the carbon dioxide ($CO_2$) rich solvent is free of monoethanolamine.

Preferably, wherein the carbon dioxide ($CO_2$) lean solvent has a concentration of carbon dioxide of from 0.0 to 0.7 mol $L^{-1}$.

Further preferably, wherein the carbon dioxide ($CO_2$) rich solvent has a concentration of carbon dioxide of from 2 to 3.3 mol $L^{-1}$.

Advantageously, wherein applying microwaves to the carbon dioxide ($CO_2$) rich solvent to form a carbon dioxide ($CO_2$) lean solvent comprises applying electromagnetic radiation with a wavelength from one meter to one millimetre and with frequencies from 300 MHz to 300 GHz.

Preferably, wherein applying microwaves to the carbon dioxide ($CO_2$) rich solvent to form a carbon dioxide ($CO_2$) lean solvent comprises applying electromagnetic radiation in either the UHF or EHF bands.

Further preferably, wherein applying microwaves to the carbon dioxide ($CO_2$) rich solvent to form a carbon dioxide ($CO_2$) lean solvent comprises applying microwaves with a power of from 0.5 to 2.0 kW.

Advantageously, wherein applying microwaves to the carbon dioxide ($CO_2$) rich solvent to form a carbon dioxide ($CO_2$) lean solvent comprises applying microwaves with a power of from 0.9 to 1.4 kW.

Preferably, wherein applying microwaves to the carbon dioxide ($CO_2$) rich solvent to form a carbon dioxide ($CO_2$) lean solvent heats the solvent to from 85 to 95° C.

According to a further aspect of the present invention, there is provided a system for regenerating a carbon dioxide ($CO_2$) lean solvent from a carbon dioxide ($CO_2$) rich solvent, the system comprising:
a microwave regeneration unit.

Preferably, wherein the microwave regeneration unit is a system comprising a microwave transducer (magnetron), a reboiler through which microwave irradiation can penetrate and an insulating layer to prevent radiative losses and ensure efficient absorption of microwaves into any solvent present in the reboiler (optionally, wherein the insulating layer is a Faraday Cage).

Further preferably, wherein the microwave transducer (magnetron) is configured to provide electromagnetic radiation with a wavelength from one meter to one millimetre and with frequencies from 300 MHz to 300 GHz.

Advantageously, wherein the microwave transducer (magnetron) is configured to provide electromagnetic radiation in either the UHF or EHF bands.

Preferably, wherein the microwave transducer (magnetron) is configured to provide microwaves with a power of from 0.5 to 2.0 kW.

Further preferably, wherein the microwave transducer (magnetron) is configured to provide microwaves with a power of from 0.9 to 1.4 kW.

Advantageously, wherein the reboiler through which microwave irradiation can penetrate is formed of quartz.

Preferably, wherein the Faraday cage is an earthed metal screen surrounding the microwave transducer (magnetron) and the reboiler to exclude electrostatic and electromagnetic influences.

According to a further aspect of the present invention, there is provided a system for capturing carbon dioxide comprising a system for regenerating a carbon dioxide ($CO_2$) lean solvent from a carbon dioxide ($CO_2$) rich solvent according to the above.

Preferably, further comprising an absorber for contacting flue gas with carbon dioxide ($CO_2$) lean solvent to form carbon dioxide ($CO_2$) rich solvent.

Further preferably, further comprising a stripper, in fluid connection with the absorber, for regenerating carbon dioxide ($CO_2$) rich solvent from carbon dioxide ($CO_2$) lean solvent.

Advantageously, wherein:
the absorber is an absorber packed column or a rotary packed bed absorber; and,
the stripper is a stripper packed column or a rotary packed bed stripper.

Preferably, wherein the absorber and the stripper are in fluid connection through a solvent heat exchanger.

Further preferably, wherein the microwave regeneration unit is in fluid communication with the stripper and the solvent heat exchanger, the microwave regeneration unit acting to apply microwaves to carbon dioxide ($CO_2$) rich solvent exiting the stripper to form a carbon dioxide ($CO_2$) lean solvent for introduction to the solvent heat exchanger, thereby regenerating solvent for introduction to the absorber.

The presently claimed methods and systems are typically applied to carbon capture processes and methods. However, the invention is not restricted to that particular use but could be applied to any method or system requiring the removal of $CO_2$ components from a solvent. The present invention is not restricted to the separation of a liquid and gas.

BRIEF DESCRIPTION OF THE DRAWINGS

Embodiments of the invention are described below with reference to the accompanying drawings. The accompanying drawings illustrate various embodiments of systems, methods, and embodiments of various other aspects of the disclosure. Any person of ordinary skill in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Some embodiments of this disclosure will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred systems and methods are now described.

Embodiments of the present disclosure will be described more fully hereinafter with reference to the accompanying drawings in which like numerals represent like elements throughout the figures, and in which example embodiments are shown. Embodiments of the claims may, however, be embodied in many different forms and should not be construed as limited to the embodiments set forth herein. The examples set forth herein are non-limiting examples and are merely examples among other possible examples.

Some of the terms used to describe the present invention are set out below:

"Flue gas" is a gas exiting to the atmosphere via a pipe or channel that acts as an exhaust from a boiler, furnace or a similar environment.

"Intensified solvent" refers to a solvent that can achieve a high $CO_2$ loading (optionally 3.0 mol/L) and forms a greater proportion of bicarbonate salts than carbamate salts. Examples of intensified solvents are included in US 2017/0274317 A1, the disclosure of which is incorporated herein by reference. An intensified solvent, in some embodiments, comprises: an alkanolamine, a reactive amine and a carbonate buffer. An intensified solvent, in some embodiments, comprises: a tertiary amine (for example, N-methyl-diethanolamine and/or 2-(diethylamino)ethanol), and/or, a sterically hindered amine (for example, 2-amino-2-ethyl-1,3-propanediol, 2-amino-2-hydroxymethyl-1,3-propanediol, 2-methylamino-2-methyl propanol and/or 2-amino-2-methyl-1-propanol), and/or, a polyamine (for example, 2-piperazine-1-ethylamine and/or 1-(2-hydroxyethyl) piperazine), and/or, a carbonate buffer (for example, potassium carbonate), and/or, water (for example, deionised water). One example of an intensified solvent is CDRMax, as sold by Carbon Clean Solutions Limited. CDRMax, as sold by Carbon Clean Solutions Limited, has the following formulation: from 15 to 25 wt. % 2-amino-2-methyl propanol (CAS number 124-68-5); from 15 to 25 wt. % 1-(2-ethylamino)piperazine (CAS number 140-31-8); from 1 to 3 wt. % 2-methylamino-2-methyl propanol (CAS number 27646-80-6); from 0.1 to 1 wt. % potassium carbonate (584-529-3); and, the balance being deionised water (CAS number 7732-18-5).

"$CO_2$ lean solvent" refers to solvent with a relatively low concentration of carbon dioxide. In a carbon dioxide capture process, $CO_2$ lean solvent for contact with flue gases typically has a concentration of carbon dioxide of from 0.0 to 0.7 mol $L^{-1}$.

"$CO_2$ rich solvent" refers to a solvent with a relatively high concentration of carbon dioxide. In a carbon dioxide capture process, $CO_2$ rich solvent after contact with flue gases typically has a concentration of carbon dioxide of from 2 to 3.3 mol $L^{-1}$.

"Absorber" refers to a part of the system where components of the solvent ($CO_2$ lean solvent) interact with $CO_2$ and uptake $CO_2$ from the gaseous phase to the liquid phase, to form $CO_2$ rich solvent.

"Stripper" refers to a part of the system where the $CO_2$ rich solvent is stripped of $CO_2$ to form $CO_2$ lean solvent.

"Static packed column" refers to a part of a system used in a separation process. It is a hollow column packed with a "packing bed". The packing bed is a structured packing which may contain catalysts or absorbents. The packed column improves the contact between the two materials passing through.

"Rotary Packed Bed (RPB)" refers to an absorber or a stripper where the packing is housed in a rotatable disk (rather than in a packing bed, as in a static packed column), which can be rotated at high speed to generate a high gravity centrifugal force within the absorber or stripper.

"Microwave Regeneration" (MR) unit refers to a system comprising a microwave transducer (magnetron), a reboiler through which microwave irradiation can penetrate (the reboiler optionally being a vessel substantially transparent to microwaves) and an insulating layer to prevent radiative losses and ensure efficient absorption of microwaves into any solvent present in the reboiler (for example, a Faraday Cage).

"ProTreat®" is a simulation tool for simulating gas treating experiments. ProTreat® is provided by Optimized Gas Treating, Inc.

Figure 2:
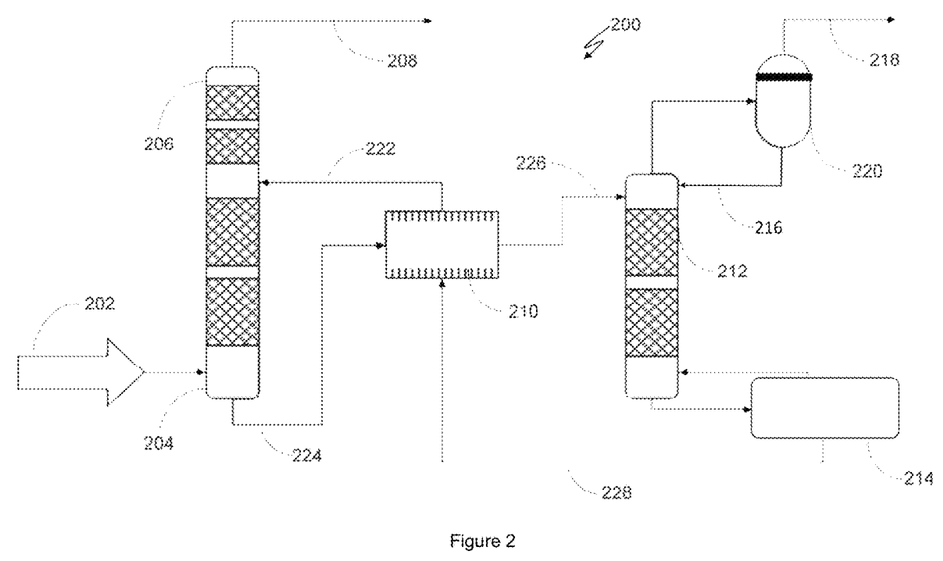
FIG. 2 shows schematically a system according to the present invention. The system includes a microwave reboiler instead of a conventional reboiler.

FIG. 2 is a schematic diagram 200 of a system used to capture $CO_2$ according to the present invention.

A $CO_2$ rich flue gas 202 may enter packed bed column 204 of the system 200. In the packed bed column 204, the $CO_2$ from the flue gas is contacted with a $CO_2$ lean solvent 222. By way of this contact, $CO_2$ is absorbed to form a $CO_2$ rich solvent. The packed bed column 204 is typically known as an absorber.

The temperature of the $CO_2$ lean solvent 222 entering the absorber 204 is typically 40° C.

In the absorber 204, the $CO_2$ rich flue gas 202 may come into contact with a lean solvent 222; optionally, where the solvent 222 is an intensified solvent. Components within the solvent 222 selectively react with the $CO_2$ gas resulting in the $CO_2$ transferring from the gas phase into the liquid phase. Upon reacting with the $CO_2$, the solvent becomes $CO_2$ rich solvent 224.

In one example of the invention, the packed bed of the absorber 204 may be a static packed column. In a static packed column absorber 204, a lean solvent 222 may enter at the top of the static packed column absorber 204 and may cascade down through the static packed column absorber 204 under the influence of gravity. The $CO_2$ rich flue gas 202 enters at the bottom of the static packed column absorber 204 and rises up the column. The lean solvent 222 and the $CO_2$ rich flue gas 202 come into contact in a counter-current configuration. The $CO_2$ present in the flue gas 202 may react with components of the $CO_2$ lean solvent 222 and transfers into the liquid phase.

In another example of the invention, the static packed column is optionally replaced with a Rotary Packed Bed (RPB). In an RPB absorber 204, the $CO_2$ lean solvent 222 is fed through an inner radius of the RPB absorber 204. In the RPB absorber 204, packing may be housed in a rotatable disk. The rotatable disk is rotated at high speed to generate centrifugal force. The centrifugal force may be exerted upon the solvent when distributed onto the packing. Upon application of the centrifugal force, the solvent may move radially from the inner radius of the RPB absorber 204 towards an outer radius of the RPB absorber 204. The solvent may come into contact with the flue gas 202 comprising $CO_2$, in a cross or counter-current configuration. Such rotation of the RPB absorber 204 may increase the mixing between the flue gas 202 and the solvent, and may lead to an improved mass transfer of $CO_2$ from the flue gas 202 to liquid solvent.

The depleted $CO_2$ flue gas 208 is optionally washed before release into the atmosphere. A typical wash system comprises a packed column 206. The wash method may comprise of wash stages that remove traces of the solvent and volatile chemicals. The depleted $CO_2$ flue gas may pass through the wash stages to remove traces of the solvent and any volatile chemicals formed through degradation reactions of the solvent components.

In one example of the invention, the packed column of 206 may be a static packed column. In the static packed column 206, the water wash media may enter at the top of the column and may fall under the influence of gravity, whilst the depleted $CO_2$ flue gas 208 may enter from the bottom and rise up the column. The wash water media and the $CO_2$ depleted flue gas may mix in a counter-current configuration.

In another example of the invention, the static packed column is optionally replaced with a RPB. In the packed bed 206, wash water may be fed from an inner radius of the RPB and may flow radially across the packing to an outer radius of the other RPB, under centrifugal force generated by rotating motion. $CO_2$ depleted flue gas may be introduced from the outer radius of the other RPB absorber and may flow towards the inner radius of the other RPB absorber, the wash water media and the $CO_2$ depleted flue gas may come into contact in a counter-current configuration.

A similar washing process can be applied. In this example of the invention, the water wash media may be substituted for an appropriately concentrated solution of acidic media.

Cleaned flue gas 208 obtained upon washing may be vented to the atmosphere. Such flue gas is depleted of the $CO_2$.

The reaction between the solvent 222 and the $CO_2$ rich flue gas 202 may be exothermic and may create heat. The temperature of the $CO_2$ rich solvent 224 formed from the reaction is typically 55° C. plus or minus 10%. The solvent 224 may pass through a heat exchanger 210. When the rich solvent leaves the heat exchanger, the temperature of the solvent is typically from 60 to 80° C., plus or minus 10%. In FIG. 2, the solvent at this temperature is labelled 226.

The $CO_2$ rich solvent 226 may pass onto a third packed bed column 212. In the third packed bed column 212, the $CO_2$ is typically removed from the rich solvent 226. The third packed bed column is typically known as a stripper.

In one example of the invention, the packed bed of the stripper 212 may be a static packed column. The $CO_2$ rich solvent 226 may enter at the top of the column and may fall under the influence of gravity.

In another example of the invention, the packed column may be replaced with a RPB. In the RPB stripper 212, the rich solvent 226 may enter the RPB stripper 212 through the outer radius of the RPB stripper 212. The rotation of the RPB stripper 212 may generate a centrifugal force. The centrifugal force may draw the solvent 226 to the outer radius of the RPB stripper 212. As the solvent passes over the packing bed of the stripper 212, there may be a high degree of turbulence that may cause droplet formation, which in turn may increase the effective surface area for mass transfer of the rich solvent 226.

At the outer radius of the RPB stripper 212, the solvent rich 226 may be collected in a sump. The solvent in the sump may pass from the solvent sump to a microwave regeneration (MR) unit 214, where it may be subjected to microwave radiation.

In an example of the invention, the conventional reboiler is replaced with a microwave regeneration (MR) unit 214. In the MR unit 214, the microwave radiation acts to heat the solvent 226. Microwave radiation penetrates liquids to several centimetres, and therefore microwave radiation is able to transfer greater heat than a conventional heating method. The microwave radiation typically heats the solvent 226 to 90° C. plus or minus 10%.

As the solvent 226 is heated, steam is produced. The steam leaves the MR unit 214 and enters the RPB stripper 212. The steam flows upwards through the RPB stripper 212, counter current to the rich solvent 226.

The heat from the steam heats $CO_2$ rich solvent 226, and the reaction between the solvent components and $CO_2$ is reversed.

At the top of the RPB stripper 212, the gaseous $CO_2$ 218 produced in a reflux drum 220 and can be used for downstream methods.

At the top of the RPB stripper 212, a condenser cools the steam to typically 40° C. This condenses the steam into water 116. The condensed water is returned to the top of the RPB stripper 212 and recombined with the solvent to form lean solvent 228. The temperature of $CO_2$ lean solvent 228 is 90° C. plus or minus 10%.

The $CO_2$ lean solvent 228 is transferred to the absorber 204 via the heat exchanger 210, ready for use in the system 200 again. The heat exchanger may use the heat from the $CO_2$ lean solvent 228 to heat the rich solvent 224. The temperature of the rich solvent 224 may increase by typically from 15 to 25° C. to form $CO_2$ rich solvent 226. Upon exchanging heat, the temperature of the $CO_2$ lean solvent 228 typically reduces by 50° C., to form $CO_2$ lean solvent 222.

In this example, the MR unit 214 comprises a microwave transducer (magnetron), a reboiler transparent to microwaves and a Faraday cage. The reboiler is typically transparent to microwaves and may be composed of quartz and/or other microwave-transparent materials.

In use, the microwave-transparent reboiler is irradiated by microwave radiation. In one example, the microwave radiation has a wavelength of 17.35 cm. In other examples, the microwave radiation has a wavelength of from 15 to 25 cm. The microwaves are generated by a magnetron.

In one example, the microwave beam may be produced by a WR340 rectangular waveguide connected to a 2450 MHz magnetron controlled by an Alter SM445 switching power supply. Typically, the operating pressure is atmospheric pressure.

In an example of the invention, the solvent may be an intensified solvent. Optionally, the intensified solvent comprises a tertiary amine, a sterically hindered amine, a polyamine, a salt and water. The use of an intensified solvent along with microwave radiation is typically applied to increase the absorption of the microwave radiation by the solvent. An intensified solvent optionally contains water, carbonates, bicarbonates and carbamate salts. A rise in temperature may be observed. Without wishing to be bound by theory, the rise in temperature is caused by the interaction between solvent components and the microwave radiation, resulting in the rotation of dipoles of the solvent components and ionic conduction mechanisms.

Optionally, the tertiary amine in the intensified solvent is one or more of: N-methyl-diethanolamine (MDEA) or 2-(di-ethylamino)ethanol (DEA). Optionally, the sterically hindered amines in the intensified solvent are one or more of: 2-amino-2-ethyl-1,3-propanediol (AEPD), 2-amino-2-hydroxymethyl-1,3-propanediol (AHPD) or 2-amino-2-methyl-1-propanol (AMP). Optionally, the polyamine in the intensified solvent is one or more of: 2-piperazine-1-ethylamine (AEP) or 1-(2-hydroxyethyl)piperazine. Optionally, the salt in the intensified solvent is potassium carbonate. Optionally, water (for example, deionised water) is included in the solvent so that the solvent exhibits a single liquid phase. Optionally, the solvent is CDRMax as sold by Carbon Clean Solutions Limited.

Compared to a conventional reboiler, at least one advantage of the system of the present invention is the reduction in temperature required to separate the solvent and $CO_2$ (i.e. to regenerate $CO_2$ rich solvent from $CO_2$ lean solvent). Such a reduction in temperature increases efficiency by reducing the energy required regenerate $CO_2$ rich solvent from $CO_2$ lean solvent and mitigates solvent degradation over process cycles. Such a reduction in temperature also leads to smaller systems which minimises capital expenditure on carbon capture systems.

Typical solvents used in system 200 may degrade when exposed to the higher temperatures. Reducing the temperatures used in the system 200 mitigates the degradation of solvent components. Furthermore, a shorter solvent residence time in the RPB absorber and RPB stripper reduces the degradation of the solvent further.

Further advantages of the system 200 disclosed are associated with the possible use of a RPB or multiple RPB apparatuses throughout the system. The use of an RPB apparatus compared to a static packed bed column increases the mixing in between the flue gas and the solvent, resulting in better mass transfer of $CO_2$ from liquid to gaseous phase. Therefore, a much smaller RPB stripper compared to a conventionally used stripper can be used.

Further advantages of using a RPB or multiple RPB apparatuses with a MR unit to capture $CO_2$ from flue gases include: smaller and lower capital cost for carbon capture plants because of higher rates of mass transfer; lower energy requirements per unit mass of $CO_2$ captured because of the inclusion of an inter-stage cooling step; increase in the $CO_2$ loading of the solvent; and, lower solvent degradation.

Furthermore, by using multiple RPB apparatuses in the system may reduce capital cost by mounting as the RPB, absorber, water wash, acid wash, and stripper on a single shaft.

EXAMPLES

The following is a non-limiting example that discusses the advantages of using microwave radiation to separate $CO_2$ from a solvent (i.e. to regenerate $CO_2$ rich solvent from $CO_2$ lean solvent), according to the presently claimed invention.

Example 1: Desorption Rate of $CO_2$ in a Solvent Measured as a Function of Time and Temperature In one non-limiting example, the rate of desorption of $CO_2$ from CDRMax solvent (as sold by Carbon Clean Solutions Limited) was measured as a function of time.

A laboratory scale bubble reactor containing CDRMax solution within a single mode microwave applicator at 2.45 GHz was used.

The microwaves were created by using a WR340 rectangular waveguide (89.36 mm-43.18 mm) connected to a 2450 MHz magnetron (GAE Inc., GA4001). The microwaves had a maximum power of 1.2 kW and a peak voltage of 4.5 kV. The magnetron was controlled by an Alter SM445 switching power supply. The input power supply was adjustable.

The waveguide optionally comprised a:
Three port circulator (GAE Inc., GA1105) with a cross dummy load;
Dual-directional coupler (GAE Inc., GA310x, coupling factor 60 dB, directivity 23 dB) with GA3301 coupler power interfaces;
Three-stub tuner (GAE Inc., GA1005);
Universal waveguide applicator (GAE Inc., GA600x);
Sliding short circuit (Sairem).

The microwaves were directed through the circulator and down the longitudinal axis of the waveguide. The WR340 rectangular waveguide propagated the microwave electric field, typically in the TE10 mode, resulting in the electric field of the microwave being uniform and transverse to the direction of propagation. A standing wave was created. The input microwave passed through the dual-directional coupler and three-stub tuner, and then the waveguide to the sample. The microwave interacted with the sample. Upon interacting with the sample, the microwave was reflected at normal incidence from the short circuit and directed back through the sample. Typically, after passing back through the sample, the wave power was dumped. The standing wave was created by superimposing the forward and reflected waves.

A solution of CDRMax was contained in a cylindrical quartz bubbler reactor and placed in the waveguide applicator. Quartz is transparent to the microwave region of the electromagnetic spectrum (e"<0.001), and therefore quartz is the typical chosen container material. The bubbler was sealed using PTFE collars.

A fibre-optic temperature sensor (Opsens OTG-MPK8) and signal sensor were used to measure the temperature of the solution of CDRMax.

Gases (Linde Group, >99.99% purity) were fed into the quartz bubbler via two mass flow controllers (Brooks Instruments GF-Series, 0-400 mL min$^{-1}$ $N_2$, 0-100 mL min$^{-1}$ $CO_2$). The outlet gas line from the bubbler was cooled. The outlet gas stream from the bubbler passed through a humidity meter and non-dispersive infrared (NDIR) $CO_2$ sensor (COZIR-W-100) followed by a mass flow meter (Brooks Instruments SLA5860, 0-500 mL/min) before exiting through an exhaust line. All experiments were performed at a total pressure of 1 bar. The gas lines were purged with $N_2$ before and between experimental runs.

All experiments were performed on 5 ml of CDRMax solvent and carried out at a temperature of 90° C.

To mimic the absorption stage, a binary feed gas of 80% $N_2$ and 20% $CO_2$ was bubbled through the solvent at a flow rate of 100 mL s$^{-1}$, at an ambient temperature for a predetermined period of time.

A blank absorption run with an empty reactor vessel was performed as a control to allow for the calculation of $CO_2$ absorption.

Figure 3:
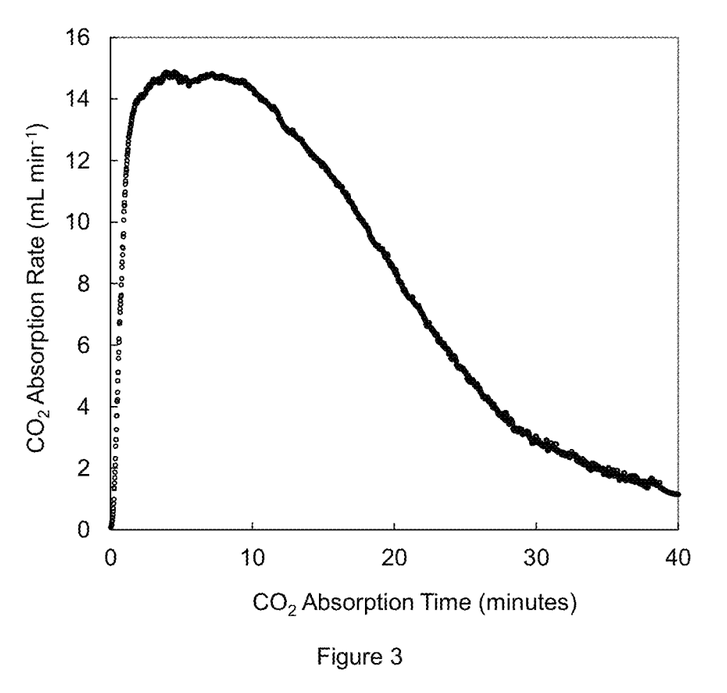
FIG. 3 shows the desorption rate and heating profile of a $CO_2$ rich solvent as a function of temperature, according to one example of the present invention.

The $CO_2$ flow rate at the reactor outlet was determined by taking the $CO_2$ sensor reading as a percentage of the total mass flow, which was subsequently logged and plotted over the predetermined absorption time to give a $CO_2$ absorption curve (FIG. 3).

The amount of $CO_2$ absorbed by the CDRMax solvent was calculated by integrating the $CO_2$ absorption curve.

Figure 4:
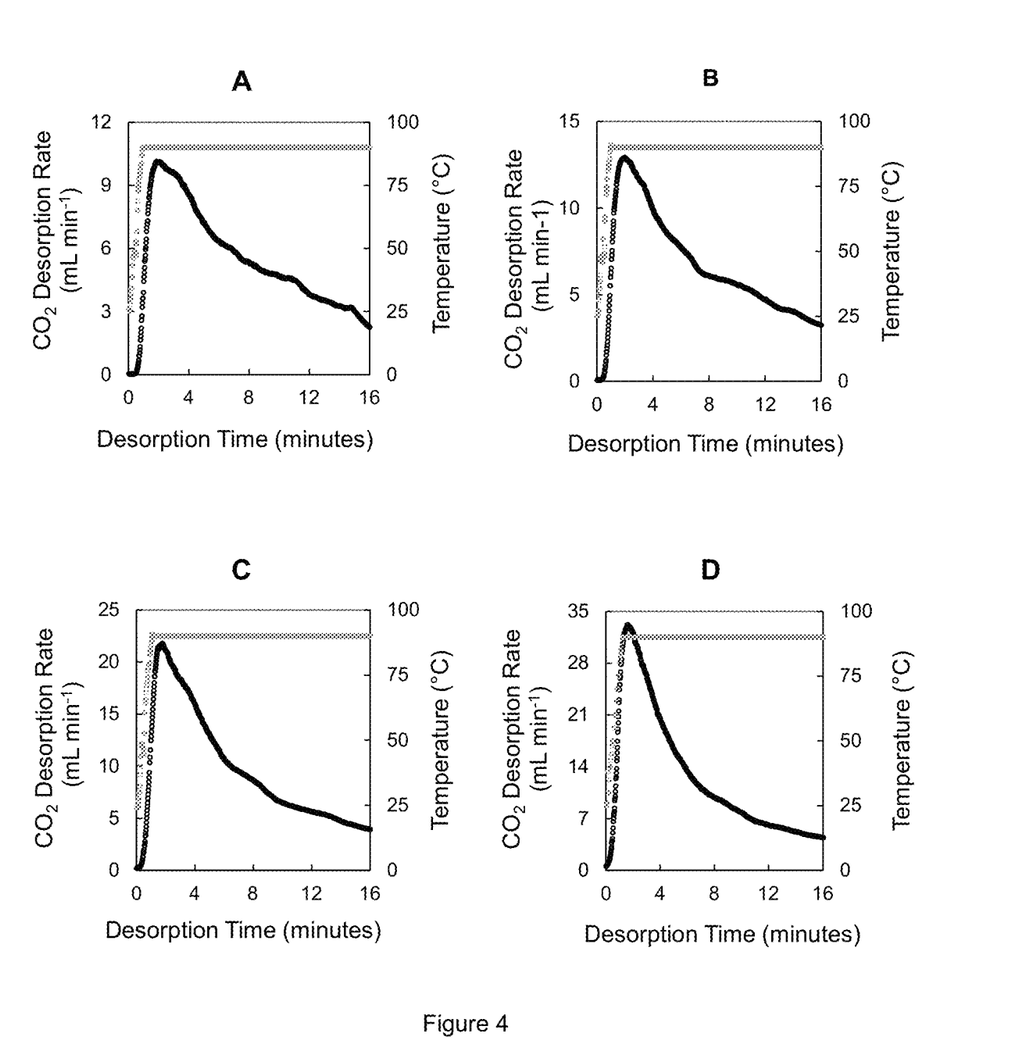
FIG. 4 shows $CO_2$ desorption rates vs. time (the plots which peak at approximately 2 minutes and decrease over time) and heating profiles (the plots which peak at approximately 1 minute and stay at 90° C. over time).

For the desorption stage, the $CO_2$ rich solvent was heated to 90° C. by exposure to microwaves. The $CO_2$ rich solvent was exposed to these conditions for 16 minutes whilst a 100 mL min$^{-1}$ flow of $N_2$ was bubbled through the CDRMax solvent. The microwave heating was performed with an initial input power of 100 W until the solution reached 90° C., after which the power was adjusted to 60 W to maintain the constant temperature. The $CO_2$ desorption rate was taken as a direct measure of the reactor outlet $CO_2$ flow rate and was logged and plotted against the desorption time (FIG. 4).

The difference between the amount of $CO_2$ absorbed and desorbed in each experiment gives the cyclic loading under the conditions tested.

Table 1 shows the results of the CDRMax solvent regeneration. The CDRMax samples tested (A-D) were of increasing rich loading due to longer contact time with the $CO_2$ containing feed gas. The cyclic loading increases with higher rich solvent loadings.

TABLE 1

CDRMax solvent loadings before and after microwave irradiation at 90° C.

| CDRMax Sample | A | B | C | D |
|---|---|---|---|---|
| Rich Loading (mol L$^{-1}$) | 1.36 | 1.52 | 2.20 | 2.80 |
| Lean Loading (mol L$^{-1}$) | 0.59 | 0.58 | 0.84 | 1.02 |
| Cyclic Loading (mol L$^{-1}$) | 0.77 | 0.94 | 1.36 | 1.76 |
| $CO_2$ Stripped (%) | 57.6 | 61.6 | 61.6 | 63.7 |

The results depicted in Table 1 can be split into three time periods to determine when the most $CO_2$ leaves the solvent phase and enters the gas phase. The three time periods were 0-5 minutes, 5-10 minutes and 10-16 minutes.

Table 2 shows the mol L$^{-1}$ and percentage $CO_2$ loading of each sample studied during each time frame.

TABLE 2

Amount of $CO_2$ stripped during intervals for CDRMax solvent samples, expressed as mol L$^{-1}$ and percentage of total $CO_2$ stripped.

| | A | | B | | C | | D | |
|---|---|---|---|---|---|---|---|---|
| Stripping Time | mol L$^{-1}$ | % | mol L$^{-1}$ | % | mol L$^{-1}$ | % | mol L$^{-1}$ | % |
| 0-5 minutes | 0.33 | 42.2 | 0.40 | 43.2 | 0.67 | 49.4 | 0.98 | 55.1 |
| 5-10 minutes | 0.25 | 32.8 | 0.30 | 31.8 | 0.41 | 30.1 | 0.49 | 27.6 |
| 10-16 minutes | 0.19 | 25.0 | 0.23 | 24.9 | 0.28 | 20.5 | 0.31 | 17.3 |

The majority of the $CO_2$ is stripped from the solvent during the first five minutes of microwave irradiation. The system has the greatest stripping efficiency when the solvents used have an initially high $CO_2$ loading.

Example 2: Simulations Showing the Desorption Rate of $CO_2$ in a Solvent Measured as a Function of Time and Temperature In one non-limiting example, process simulations were performed using ProTreat® to determine the extent of $CO_2$ stripping that occurs when a conventional steam reboiler is used to regenerate the CDRMax solvent samples at similar temperatures and pressures (90° C. and 0 bar) as used when a microwave regeneration unit is used as the reboiler.

The efficiency of the conventional reboiler for removing $CO_2$ from the CDRMax solvent is shown in Table 3. A conventional stripper operating at 90° C. removed 7.3% of the $CO_2$ from the CDRMax solvent with a rich loading of 2.18 mol L$^{-1}$. Comparable stripping conditions (90° C. and 2.20 mol L$^{-1}$ rich solvent loading) by microwave irradiation resulted in 57.8% of the $CO_2$ being stripped from CDRMax solvent (example 1). The results show a significant increase in efficiency compared to a conventional steam reboiler process.

TABLE 3

Simulation results from operating a conventional reboiler at lower temperatures and atmospheric pressure for CDRMax $CO_2$ capture processes.

| | Samples | | |
|---|---|---|---|
| CDRMax $CO_2$ Loading | E | F | G |
| Rich loading (mol L$^{-1}$) | 2.18 | 2.43 | 1.59 |
| Lean Loading (mol L$^{-1}$) | 2.02 | 2.00 | 1.16 |
| Cyclic Loading (mol L$^{-1}$) | 0.16 | 0.43 | 0.43 |
| $CO_2$ Stripped (%) | 7.3 | 17.7 | 27 |
| Reboiler Temperature (° C.) | 90.0 | 90.4 | 100.8 |

Comparing the results from samples E and F shows that a higher initial $CO_2$ loading of the rich solvent resulted in a greater $CO_2$ stripping. Additionally comparing samples F and G, a higher reboiler temperature increased the $CO_2$ removed from the solvent.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A system for regenerating a carbon dioxide ($CO_2$) lean solvent from a $CO_2$ rich solvent, the system comprising:
   a microwave regeneration unit,
   wherein the microwave regeneration unit is a system comprising a microwave transducer or magnetron, a reboiler through which microwave irradiation can penetrate and an insulating layer to prevent radiative losses and ensure efficient absorption of microwaves into any solvent present in the reboiler.

2. The system of claim 1, wherein the microwave transducer or magnetron is configured to provide at least one of: (i) electromagnetic radiation with a wavelength from one meter to one millimetre and with frequencies from 300 MHz to 300 GHz, (ii) microwaves with a power of from 0.5 to 2.0 kW, or (iii) a combination thereof.

3. The system of claim 1, wherein the microwave transducer or magnetron is configured to provide at least one of: (i) electromagnetic radiation in either the UHF or EHF bands, (ii) microwaves with a power of from 0.9 to 1.4 kW, or (iii) a combination thereof.

4. The system of claim 1, wherein the reboiler through which microwave irradiation can penetrate is formed of quartz.

5. The system of claim 1, wherein the Faraday cage is an earthed metal screen surrounding the microwave transducer or magnetron and the reboiler to exclude electrostatic and electromagnetic influences.

6. A system for capturing carbon dioxide comprising a system for regenerating a carbon dioxide ($CO_2$) lean solvent from a $CO_2$ rich solvent according to claim 1.

7. The system of claim 6, further comprising an absorber for contacting flue gas with the $CO_2$ lean solvent to form the $CO_2$ rich solvent.

8. The system of claim 7, further comprising a stripper in fluid connection with the absorber for regenerating the $CO_2$ rich solvent from the $CO_2$ lean solvent.

9. The system of claim 7, wherein:
   the absorber is an absorber packed column or a rotary packed bed absorber; and
   the stripper is a stripper packed column or a rotary packed bed stripper.

10. The system of claim 7, wherein the absorber and the stripper are in fluid connection through a solvent heat exchanger.

11. The system of claim 7, wherein the microwave regeneration unit is in fluid communication with the stripper and the solvent heat exchanger, the microwave regeneration unit acting to apply microwaves to the $CO_2$ rich solvent exiting the stripper to form the $CO_2$ lean solvent for introduction to the solvent heat exchanger, thereby regenerating solvent for introduction to the absorber.

12. A method for regenerating a carbon dioxide ($CO_2$) lean solvent from a $CO_2$ rich intensified solvent, the method comprising:
   providing the system of claim 1, and a $CO_2$ rich intensified solvent comprising an alkanolamine, a reactive amine, and a carbonate buffer; and
   applying microwaves to the $CO_2$ rich intensified solvent to form a $CO_2$ lean solvent.

13. The method of claim 12, wherein the intensified solvent comprises at least one of:
   a solvent that can achieve a high $CO_2$ loading and forms a greater proportion of bicarbonate salts than carbamate salts;
   a solvent that can achieve a high $CO_2$ loading due to a high concentration of active $CO_2$ absorbing components; or
   a combination thereof.

14. The method of claim 12, wherein
   the intensified solvent comprises at least one of:
   a tertiary amine;
   a sterically hindered amine;
   a polyamine;
   water; or
   a combination thereof.

15. The method of claim 12, wherein the intensified solvent comprises:
   from 15 to 25 wt. % 2-amino-2-methyl propanol;
   from 15 to 25 wt. % 1-(2-ethylamino) piperazine;
   from 1 to 3 wt. % 2-methylamino-2-methyl propanol;
   from 0.1 to 1 wt. % potassium carbonate; and
   the balance being deionised water.

16. The method of claim 12, wherein the $CO_2$ rich intensified solvent is free of monoethanolamine.

17. The method of claim 12, wherein the $CO_2$ lean solvent has a concentration of carbon dioxide of from 0.0 to 0.7 mol $L^{-1}$.

18. The method of claim 12, wherein the $CO_2$ rich intensified solvent has a concentration of carbon dioxide of from 2 to 3.3 mol $L^{-1}$.

19. The method of claim 12, wherein applying microwaves to the $CO_2$ rich intensified solvent to form the $CO_2$ lean solvent comprises: applying electromagnetic radiation with a wavelength from one meter to one millimetre and with frequencies from 300 MHz to 300 GHz, applying microwaves to the $CO_2$ rich intensified solvent to form the $CO_2$ lean solvent comprises applying microwaves with a power of from 0.5 to 2.0 kW, or a combination thereof.

20. The method of claim 12, wherein applying microwaves to the $CO_2$ rich intensified solvent to form the $CO_2$ lean solvent comprises at least one of: applying electromagnetic radiation in either the UHF or EHF bands, applying microwaves with a power of from 0.9 to 1.4 KW, or a combination thereof.

21. The method of claim 12, wherein applying microwaves to the $CO_2$ rich intensified solvent to form the $CO_2$ lean solvent heats the solvent to from 85 to 95° C.

22. The method of claim 12, wherein the $CO_2$ rich intensified solvent comprises at least one of:
   at least one tertiary amine selected from: N-methyl-diethanolamine and 2-(diethylamino) ethanol;
   at least one sterically hindered amine selected from: 2-amino-2-ethyl-1,3-propanediol, 2-amino-2-hydroxymethyl-1,3-propanediol, and 2-amino-2-methyl-1-propanol;
   at least one polyamine selected from 2-piperazine-1-ethylamine and 1-(2-hydroxyethyl) piperazine;
   a carbonate buffer that is potassium carbonate;
   deionised water; or
   a combination thereof.

* * * * *